April 9, 1963 T. HELLRICH 3,084,465
ARTIFICIAL TREE
Filed March 10, 1960 3 Sheets-Sheet 1
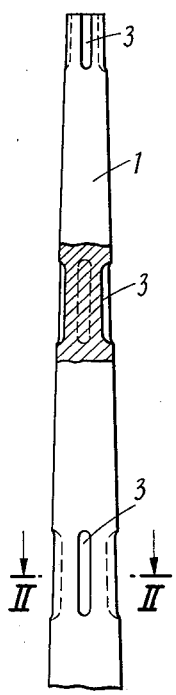
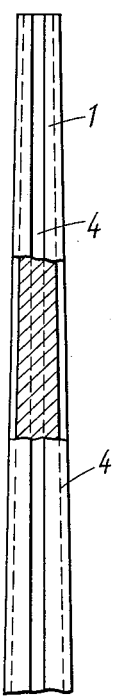
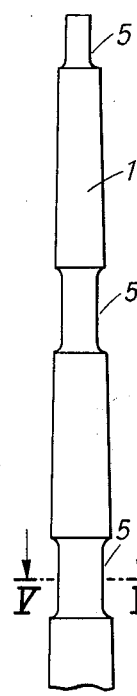
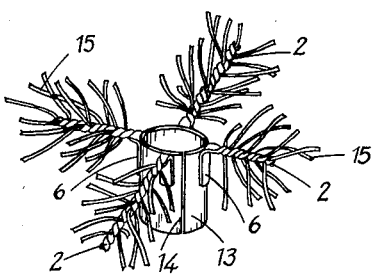
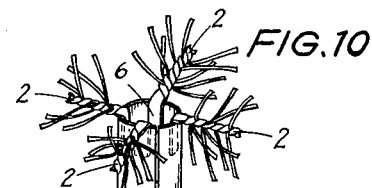
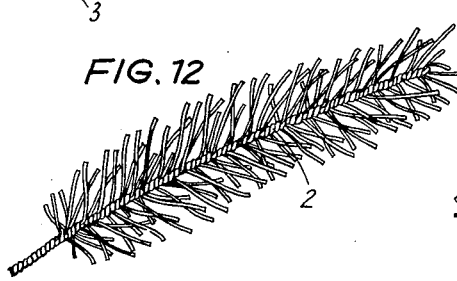
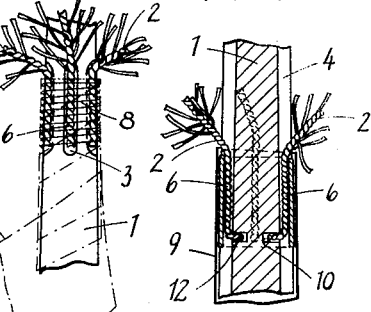
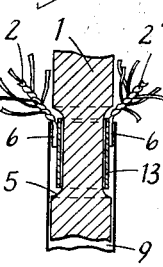
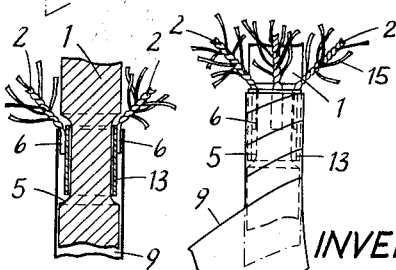
INVENTOR:
T. Hellrich
BY Richards & Geier
ATTORNEYS April 9, 1963 T. HELLRICH 3,084,465
ARTIFICIAL TREE
Filed March 10, 1960 3 Sheets-Sheet 2
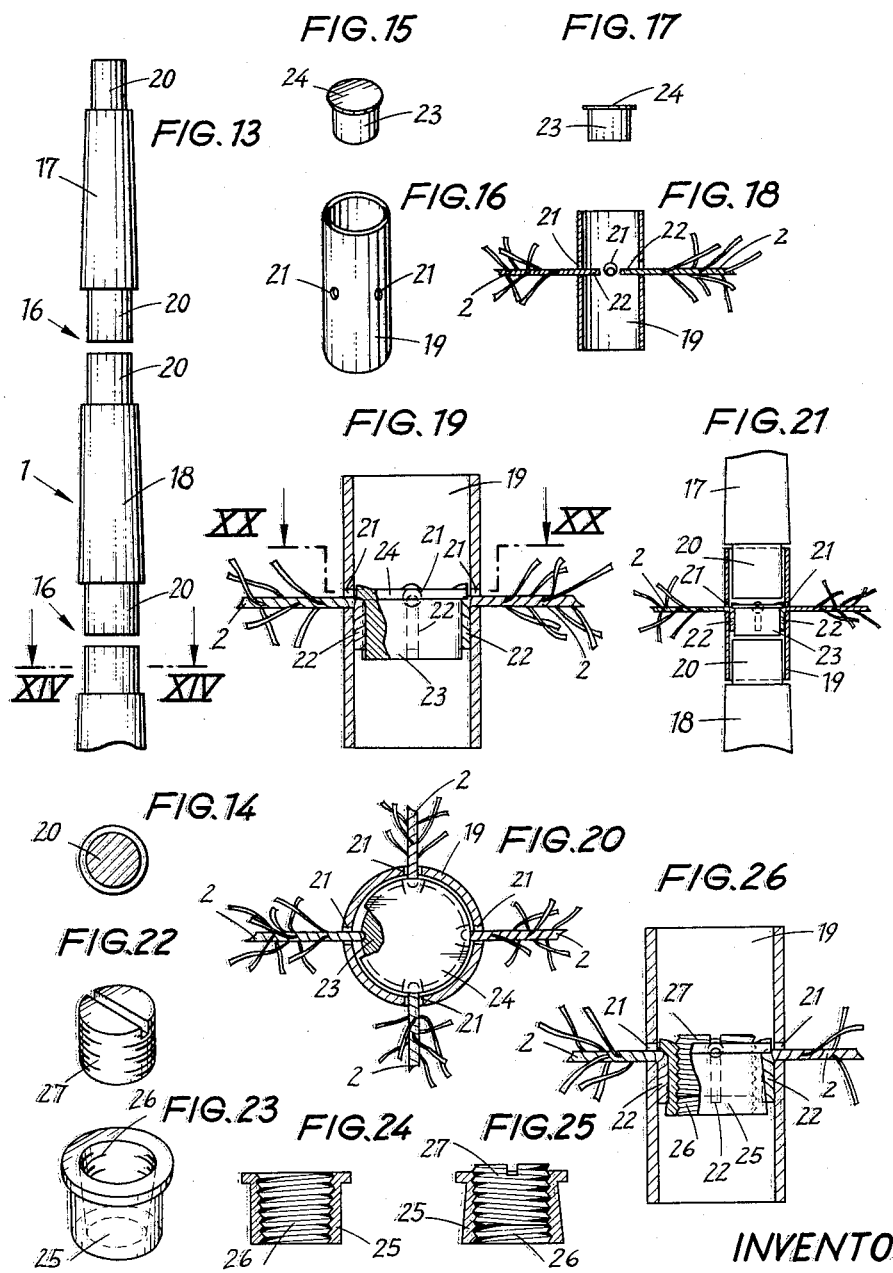
INVENTOR:
Tobias Hellrich
BY
Richards Geier
ATTORNEYS April 9, 1963 T. HELLRICH 3,084,465
ARTIFICIAL TREE
Filed March 10, 1960 3 Sheets-Sheet 3
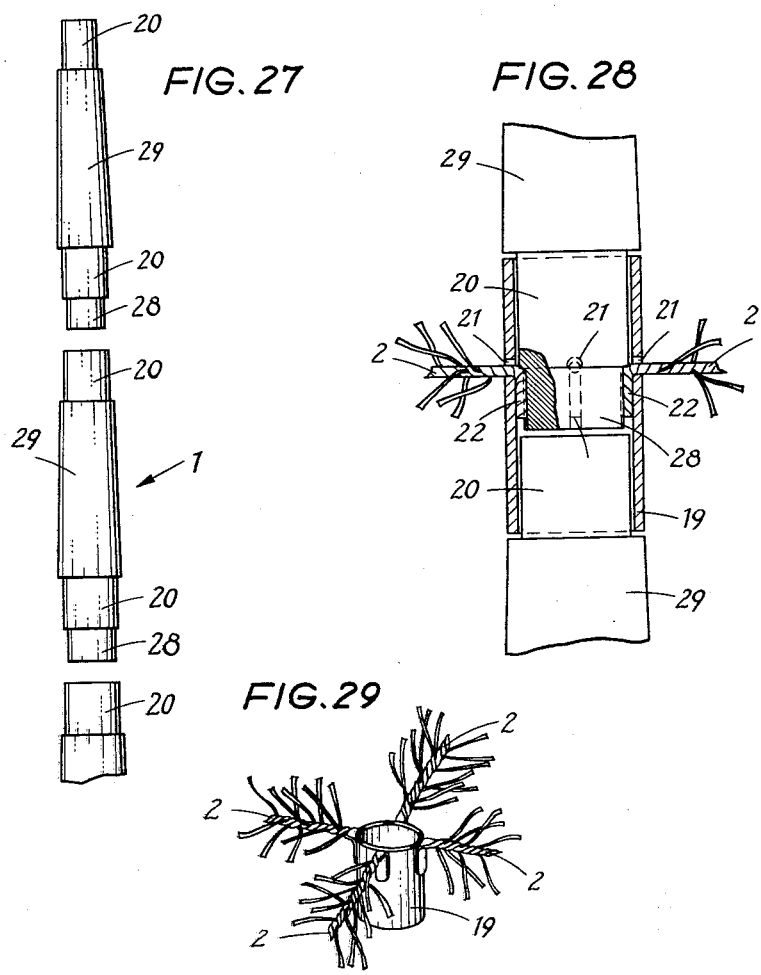
INVENTOR:
Tobias Hellrich
BY
Richards & Geier
ATTORNEYS

United States Patent Office 3,084,465
Patented Apr. 9, 1963

3,084,465
ARTIFICIAL TREE
Tobias Hellrich, Birkenstrasse 4, Schwaig,
near Nurnberg, Germany
Filed Mar. 10, 1960, Ser. No. 14,058
4 Claims. (Cl. 41—15)

The present invention relates to artificial trees, and particularly Christmas trees, which may be used, for example, as table decorations.

The known artificial trees generally consist of a wooden trunk which is secured to a base and has a plurality of stiff wires secured thereto which form branches and extend radially and slightly upwardly inclined toward the outside. By means of binding wire, fibers or bristles are attached to these wires so as to stimulate needles. Thus, for example, dyed, longitudinally slit bird feathers have been used which were secured to the wire branch by means of thin binding wire. For covering the points of connection between the trunk and the wire branches and also for covering the binding wires, the trunk of the tree is usually wrapped with a paper bandage which is dyed in the color of a natural tree trunk and imitates the bark thereof.

It is the principal object of the present invention to provide a new and improved manner of producing artificial trees, and especially Christmas trees. More particularly, it is an object of the invention to provide an improved manner of securing the wire branches of such a tree to the trunk thereof so that the bent ends of the wire branches which are secured to the tree trunk will not as in previous artificial trees result in thickened portions on the trunk so that the outer diameter of the trunk will either remain uniform throughout its length or decrease gradually and smoothly toward the top of the tree and the slender appearance of the trunk will not be interrupted by such thickened portions.

This object may be attained according to the invention by providing the tree trunk with grooves or recesses extending in the longitudinal direction of the trunk and at least within the area in which the bent ends of the wire branches are connected to the trunk. The bent wire ends will therefore be disposed within these recesses and will no longer project from the peripheral surface of the trunk. The recesses are therefore preferably made of a depth approximately corresponding to the thickness of the bent wire ends of the branches so that these ends will not only lie within the generated surface of the trunk but the latter will also not show any depressions at the connecting points of the branches.

The recesses may according to the invention be made in the form of grooves extending in the longitudinal direction of the trunk. This has the special advantage that the wire ends of the branches will be laterally secured by the side walls of the grooves and thus not be able to turn laterally. It is also possible to provide a separate groove for the end of each branch and to make this groove of a length corresponding to the bent wire end so that the branch will also be prevented from shifting in the longitudinal direction of the trunk. If the artificial tree is to be of a more inexpensive construction, the grooves may also be made so as to extend along the entire length of the trunk. This simplifies the operation of cutting the grooves into the trunk and it also simplifies the insertion of the bent wire ends into the grooves, especially if, according to another feature of the invention an additional securing element is applied in the form of a ring or sleeve. In order to prevent the branches also in this case from sliding in the longitudinal direction of the trunk, it is possible to provide the tree trunk with radially extending bores into which the inwardly bent end portion of a bent wire end of a branch is inserted.

Instead of longitudinal grooves, it is also possible according to the invention to provide the tree trunk with annular grooves which are adapted to receive the bent wire ends of a ring of branches and which has a width at least equal to the length of the bent wire ends. This type of groove may be likewise very easily produced and it has the further advantage that the number of branches which are to be secured within each groove is practically unlimited. The bent wire ends of the branches may be secured in the respective grooves of the tree trunk by winding a bandage on the trunk at least over the wire ends. Such a bandage may consist in the usual manner of a strip of sheet metal or of binding wire. According to the present invention, however, this bandage may also be made in the form of a thin ring, preferably of an elastic material which is slipped over the bent ends of the branches and thus locks the same in the trunk recesses.

According to a preferred embodiment of the invention, such an elastic ring may consist of a ring of thin sheet metal which is split at one side in the longitudinal direction of the trunk. If the trunk is provided, for example, with annular grooves, such a ring will also fit into this groove and will thus not project beyond the outer surface of the tree trunk. If such an elastic ring is to be applied to a tree trunk which is provided with longitudinal grooves for securing the bent wire ends of the branches, the ring will practically not protrude at all beyond the outer surface of the trunk if the wire ends are secured to the inside thereof. The relatively thick bent wire ends of the branches will then be disposed within the grooves and be covered by the thin ring which does not interfere with the smooth outer appearance of the tree trunk. In order to facilitate the installation of the bent wire ends of the branches, it is advisable to secure the ends directly to the thin ring by soldering or welding so that by means of this ring a plurality of branches which together form a branch ring may be mounted as a unit on the tree trunk. The securing ring may, however, also be slipped on a smooth tree trunk without grooves if the disadvantage of the protrusions formed by the soldered wire ends may be taken into account.

If the tree trunk is provided with annular grooves, they may be made of such a depth that not only the ring but also the bent wire ends of the branches which are secured to the inner or outer side of the ring will lie within the annular groove which will thus be completely filled out by these parts. According to the invention, it is, however, of particular advantage if the bent wire ends of the branches are secured to the inside of the securing ring by soldering or welding. This manner of securing the branches is also especially suitable for tree trunks which are provided with longitudinal grooves since the wire ends on the inner side of the securing ring will then be disposed within the grooves. The wire ends and the grooves will therefore interengage with each other in such a manner that the ring cannot be turned and the branches will remain in a certain position independent of a bandage which may be wrapped around the tree trunk. In order to cover the connecting points of the wire branches and to attain a smooth trunk of an appearance similar to a natural tree trunk, it is, however, advisable to wrap a bandage which may consist, for example, of a paper strip, in the known manner about the entire trunk.

The feature of the present invention that the bent wire ends of the branches are secured in recesses in the tree trunk also has the advantage that the wires which are used for the branches may be of a considerable thickness and may therefore also be very stiff. According to a further embodiment of the invention, the trunk of the artificial tree may be divided at a point within each annular groove into two sections, the tenonlike ends of which may be inserted into a sleeve which then connects the two sections with each other. This embodiment has the advantage that in its production not only the number of individual branches may be varied, but also the total height of the tree by the use of a different number of individual parts. Furthermore, it will with this embodiment be possible to keep the parts of the tree in a relatively small box.

Another feature of the invention consists in utilizing the sleeve not only as a connecting member of two adjacent trunk sections, but also as a support of the branches of the tree which may either be rigidly secured to the sleeve or be removably connected thereto in any desired number.

The removable connection of the branches to the sleeve may according to the invention be carried out in different manners which, however, have in common that the sleeve is provided with bores for passing the ends of the branches therethrough in order to permit them to be bent over at the inside of the sleeve and the bent end portions then to be clamped in a fixed position. The bending and clamping of the ends of the branches may be carried out either by a tenonlike end of a trunk section or by means of a plug which serves solely for clamping the wire ends.

If the trunk sections themselves and especially their tenonlike ends are to be used as securing elements, this manner of securing the branches will at the same time serve as a solid seat of the respective trunk section in the sleeve. In this case, however, it is advisable to provide one of the two tenons of the adjacent trunk sections with a reduced end portion so that the tenon which clamps the end of the branches will be fully inserted into the sleeve. This end portion of the tenon is therefore made of a diameter corresponding to the inner diameter of the sleeve minus twice the thickness of one of the ends of the wire branches, while the diameter of the remaining part of the tenon corresponds to the inner diameter of the sleeve which in this case is preferably made of a length substantially corresponding to the combined length of the two tenons of the adjacent trunk sections.

In the event, however, that the ends of the branches are not to be clamped by the trunk sections or their tenonlike ends but by a plug which is pushed into the sleeve which also contains the tenons, a longer sleeve has to be provided. If this embodiment of the invention is applied, the branches will therefore not be secured simultaneously with the insertion of a trunk section, but the desired number of branches, which also depends upon the number of bores which are provided in the sleeve, are first inserted into the sleeve and are then bent over and clamped down by the insertion of the plug. Only after this has been done, the trunk sections will be inserted into the two open ends of the sleeve.

The plug as well as the trunk sections and the sleeve may be made of a suitable plastic, although these parts may also consist of rubber, metal, wood, compressed carboard, drawn sheet metal, or other suitable materials. The plug is preferably made of a conical shape toward one end and the tenonlike ends of those trunk sections which are to be used for clamping the wire ends are also preferably made conical. The wider end of the plug is preferably provided with a collar or flange. This insures, on the one hand, that the plug while being inserted will meet a gradually increasing resistance due to the increasing friction on the wire ends of the branches, while the flange, on the other hand, prevents that the bolt might be pushed too deeply into the sleeve and beyond the corners of the bent wire ends since the flange will come to rest on these corners. The branches will therefore also be clamped in this embodiment by a pressure upon the securing element during its insertion into the sleeve similarly as it occurs when the branches are secured by the trunk sections.

According to the further feature of the invention it is, however, also possible to attain a firm locking of the branches on the trunk or in the sleeve by the insertion of a securing element or by screwing a plug or screw into the sleeve. In the case just mentioned the invention provides in place of a single plug a flexible socket with inner screw threads together with a screw plug which may be screwed into this socket so that, because of the conical inner screw threads of the socket, the flexible wall of the socket will then be forced toward the outside and press the bent wire ends of the branches against the inner wall of the sleeve so that they will be rigidly secured to the sleeve.

These as well as other objects, features, and advantages of the present invention will become more apparent from the following detailed description thereof, particularly when read with reference to the accompanying drawings, in which—

FIGURE 1 shows a side view, partly in cross section, of a part of a trunk of an artificial tree according to the invention which is provided with longitudinal grooves within the area in which each ring of branches is secured;

FIGURE 2 shows a cross section taken along line II—II of FIGURE 1;

FIGURE 3 shows a view similar to FIGURE 1 of a part of a trunk of an artificial tree which is provided with grooves extending along the entire length thereof;

FIGURE 4 shows a similar view of a part of a trunk of an artificial tree with annular grooves within the areas in which the rings of branches are mounted;

FIGURE 5 shows a cross section taken along line V—V of FIGURE 4;

FIGURE 6 shows the manner of securing wire branches to a trunk of an artificial tree according to FIGURE 1;

FIGURE 7 shows a longitudinal section of a part of a trunk of an artificial tree according to FIGURES 3 and the manner of securing a ring of branches thereon;

FIGURE 8 shows a perspective view of a thin ring with the bent ends of wire branches 2 secured to the outside thereof;

FIGURE 9 shows a longitudinal section of the ring according to FIGURE 8 after being mounted on a trunk of an artificial tree according to FIGURE 4;

FIGURE 10 shows a perspective view of the ring according to FIGURE 8 but with the bent ends of the wire branches secured to the inside thereof;

FIGURE 11 shows a side view of the ring according to FIGURE 10 after being mounted on a trunk of an artificial tree according to FIGURE 4;

FIGURE 12 shows a perspective view of a wire branch with needles;

FIGURE 13 shows a side view of a part of a trunk which is divided into sections within the area of the annular grooves therein;

FIGURE 14 shows a cross section taken along lines XIV—XIV of FIGURE 13;

FIGURE 15 shows a perspective view of a plug for clamping the ends of wire branches in a fixed position;

FIGURE 16 shows a perspective view of a sleeve for securing trunk sections and wire branches;

FIGURE 17 shows a side view of the plug of FIGURE 15;

FIGURE 18 shows a longitudinal section of a sleeve with branches inserted therein;

FIGURE 19 shows a longitudinal section of a sleeve with branches secured by a plug;

FIGURE 20 shows a cross section taken along line XX—XX of FIGURE 19;

FIGURE 21 shows a longitudinal section of two trunk sections connected to each other by a sleeve in which the branches are secured by means of a plug;

FIGURE 22 shows a perspective view of a screw plug;

FIGURE 23 shows a perspective view of a flexible threaded socket;

FIGURE 24 shows a longitudinal section of the socket according to FIGURE 23;

FIGURE 25 shows a longitudinal section of the socket with the screw plug therein;

FIGURE 26 shows a longitudinal section of a sleeve and the ends of branches secured thereto by means of a threaded bushing and a screw plug therein;

FIGURE 27 shows a side view of several trunk sections, each of which is provided with a reduced portion on its end stud;

FIGURE 28 shows a longitudinal section of a sleeve and wire branches secured by an end of a trunk section; while FIGURE 29 shows a perspective view of a sleeve with branches soldered thereon.

In the drawings, the trunk of the artificial Christmas tree according to the invention is indicated at 1 and the individual wire branches at 2. The trunk according to FIGURE 1 is provided with a series of short longitudinal grooves 3 which are distributed along the circumference of the trunk in several groups which are spaced longitudinally from each other. Each of these grooves 3 is of a length sufficient to receive the bent wire end 6 of a branch so that the branches which are mounted in grooves 3 of each group form a ring of branches. Grooves 3 may have a cross-sectional shape as illustrated in FIGURE 2.

FIGURE 3 shows a trunk 1 which is provided with grooves 4 which extend along the entire length of the trunk and are of a cross-sectional shape similar to that as shown in FIGURE 2. The trunk according to FIGURE 4, however, is provided with annular grooves 5 which are spaced from each other longitudinally similarly as the individual groups of grooves 3 in FIGURE 1, and each of which is adapted to receive the bent ends 6 of a ring of branches 2. Grooves 3 and 5 have a length at least corresponding to the length of the bent wire ends 6 of the branches.

The manner of securing the bent ends 6 of the wire branches 2 in grooves 3, 4, and 5 is illustrated in FIGURES 6 to 11. FIGURE 6 shows a portion of a trunk 1 of an artificial tree according to FIGURE 1. The bent ends 6 of the wire branches 2 are inserted in grooves 3 and are secured therein by means of a binding wire 8 which is wound many times around the trunk over the bent ends 6 of each group or ring of branches 2. FIGURE 6 further illustrates the manner of wrapping the trunk by means of a bandage 9 which consists of a paper strip which is spirally wound around the entire length of the trunk. This paper strip 9 is preferably made in the natural color of a tree trunk and completely covers trunk 1 including the bent ends 6 of the branches which, since they are disposed within grooves 3, 4, or 5, do not project outwardly so that the slender shape of trunk 1 will not be interrupted.

FIGURE 7 illustrates the manner of securing the wire branches on a trunk 1 similar to that as shown in FIGURE 3 except for the fact that this trunk is also provided with radially extending bores 10 into which the inwardly bent wire ends 12 of the branches 2 are inserted so as to fix each branch at a certain elevation of the tree trunk. For securing the bent wire ends to the trunk, a ring 11 is slipped over them. The wall of each of these rings is made so thin so as to protrude very slightly from the surface of the trunk. This protrusion is made entirely unnoticeable by the wrapping 9 which is wound around the entire length of the trunk in the same manner as shown in FIGURE 6.

According to the embodiments of the invention as shown in FIGURES 6 and 7, the wire branches 2 are secured individually to trunk 1. A different manner of securing the branches is illustrated in FIGURES 8 to 11 in which the bent ends 6 of the branches are shown as being secured to an elastic thin ring 13 of sheet metal which is provided with a longitudinal slot 14 to permit the ring to be widened in order to slip it over trunk 1 to the point of the angular grooves 5 of the trunk according to FIGURE 4. According to the embodiment shown in FIGURE 8, the bent wire ends 6 of the branches are soldered to the outside of ring 13, whereas according to FIGURE 10 the bent wire ends 6 are disposed at the inside of ring 13 and are likewise secured thereto by soldering or welding.

The manner in which rings 13 to which the bent ends 6 of the wire branches according to FIGURES 8 and 10 are secured are slipped over and secured to the trunk is clearly illustrated in FIGURES 9 to 11. The annular grooves 5 and the bent ends 6 of the branches therein as well as ring 13 are covered by a wrapping 9 in the same manner as shown in FIGURES 6 and 7.

The wires forming the individual branches are composed of several thin wires which are twisted around each other. During this twisting process, needles 15 are inserted between and thus secured by the wires. These needles consist of thermoplastic foils or narrow foil strips, for example, of a green color. The individual needles are produced by slitting a foil strip transverse to the longitudinal direction of the branches in such a manner that a continuous longitudinal uncut strip will remain at the center. Such a foil is inserted between two wires so that the wires will lie on the continuous central strip. When the wires are being twisted, the individual needles will be shifted to an offset relation to each other as indicated particularly in FIGURE 12. By making the foil of a thermoplastic material it is possible to bend or straighten the needles so that they will not project exactly radially from the wire but be directed obliquely toward the tip of the branch and will also be distributed around the branch.

In the embodiment of the invention as shown in FIGURES 13 to 29 the trunk 1 of the artificial tree is divided into two sections 17 and 18 at a point within the annular grooves 16. These two sections are connected to each other by a sleeve 19 into which the reduced ends 20 forming studs or tenons are inserted from both sides. Approximately at the center of tube 19 the same is provided with bores 21 for the insertion of the end 22 of branches 2 which are then bent over and clamped down at the inside of the sleeve. This may be done either by a plug 23, the lower end of which may be conical while its upper end may have a flange 24, or by a flexible socket 25 with conical screw threads 26 at the inside so that, when a screw or a screw plug 27 is screwed into socket 25, the wall thereof will bend toward the outside. The further possibility of securing the wire ends 22 may be attained by providing one of the two tenons 20 of each trunk section with a reduced end portion 28, as shown in FIGURE 27.

If the branches are to be secured by a plug 23, their ends 22 are first inserted into sleeve 19 through the bores 21, whereupon plug 23 is pressed with its conical end upon the wire ends 22 so as to bend over these ends. If plug 23 is then further inserted, the wire ends 22 will be pressed against the inside of sleeve 19 and the branches will thereby be clamped tightly between the inner wall of sleeve 19 and the outer surface of plug 23. Flange 24 on plug 23, the outer diameter of which substantially corresponds to the inner diameter of sleeve 19 insures that, when plug 23 is pushed into sleeve 19, its upper edge cannot pass beyond bores 21 since flange 24 will then rest on the corners of the downwardly bent wire end 22. After the wire branches are thus secured to sleeve 19, the sleeve is fitted over the tenons 20 of two adjacent trunk sections 17 and 18. The peripheral outer surfaces of the trunk sections and sleeve 19 will then be in alignment with each other and the two sections will be fitted tightly into the sleeve since the diameter of tenons 20 corresponds to the inner diameter of sleeve 19 and the depth of the shoulder between tenons 20 and the outer surface of trunk sections 17 and 18 is equal to the wall thickness of sleeve 19. If the branches 2 are secured in this manner, sleeve 19 is made of a length substantially corresponding to the length of two tenon-like ends 20 plus the length of a plug 23, and bores 21 in sleeve 19 are disposed so that, after plug 23 has been pushed into its clamping position in the sleeve, the distances between the upper and lower ends of sleeve 19 and the upper and lower end surfaces of plug 23 will be substantially equal.

If the branches are to be secured by means of a threaded socket 25 and a screw 27, the wire ends 22 which are at first inserted into sleeve 19 through bores 21 are bent downwardly, whereupon the socket 25, which is provided with an upper flange similarly as plug 23, is pushed with some pressure between the bent ends 22. Thereupon, the screw plug 27 is screwed into the conical screw threads 26 of socket 25, whereby the wall of socket 25 is forced outwardly against the wire ends 22 so as to press the latter tightly against sleeve 19. After the branches are thus secured to sleeve 19, tenons 20 of the adjacent trunk sections 17 and 18 are pushed into sleeve 19.

According to the embodiments of the invention as shown in FIGURES 27 and 28, a separate clamping element such as plug 23 or the threaded socket 25 together with screw plug 27 may be omitted by providing one tenon 20 of each trunk section with a reduced end portion 28 of a depth corresponding to the thickness of the bent ends 22 of the wire branches. In order to attain a gradually increasing resistance between the wire ends 22 and the reduced end portions 28, on the one hand, and the inner wall of sleeve 19, on the other hand, while the clamping trunk section 29 is being inserted, the reduced end portion 28 may be made of a conical shape. The depth of the shoulder between tenon 20 and the main portion of each trunk section is also made in this embodiment of a size corresponding to the wall thickness of the sleeve so that the outer surfaces of the adjacent trunk section and the sleeve will be in alignment with each other. The length of sleeve 19 results in this case from the combined length of tenon 20 and the reduced end portion 28 on one trunk section 29 and tenon 20 without a reduced end portion 28 on the adjacent trunk section.

A further possibility of securing the branches 2 to trunk 1 may be attained by soldering the bent wire ends of the branches, for example, to the outside of a sleeve 19, as illustrated in FIGURE 29, into the open ends of which the trunk section 17 and 18 may then be inserted.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An artificial tree, particularly a Christmas tree, comprising a hollow trunk having a plurality of separate trunk portions, at least two of said trunk portions having sections of larger diameter and sections of smaller diameter which are located one next to the other, whereby said two sections of smaller diameter constitute a recessed part relatively to said sections of larger diameter, a sleeve fitting over said recessed part, and a plurality of branches consisting of wires and having bent ends rigidly connected with said sleeve.

2. An artificial tree, particularly a Christmas tree, comprising a hollow trunk having a plurality of separate trunk portions, at least two of said trunk portions having sections of larger diameter and sections of smaller diameter which are located one next to the other, whereby said two sections of smaller diameter constitute a recessed part relatively to said sections of larger diameter, a sleeve fitting over said recessed part and having a plurality of bores, and a plurality of branches consisting of wires and having ends extending through said bores, said sections of smaller diameter pressing rectangularly bent ends of said wires against said sleeve.

3. An artificial tree in accordance with claim 2, comprising a plug fitting into said sleeve.

4. An artificial tree, particularly a Christmas tree, comprising a hollow trunk having a plurality of separate trunk portions, at least two of said trunk portions having sections of larger diameter and sections of smaller diameter which are located one next to the other, whereby said two sections of smaller diameter constitute a recessed part relatively to said sections of larger diameter, a sleeve fitting over said recessed part and having a plurality of bores, a plurality of branches consisting of wires and having ends extending through said bores, and a plug fitting into said sleeve and having a conical threaded socket and a screw screwed into said socket, said plug fitting into said sleeve and pressing rectangularly bent ends of said wires against said sleeve.

References Cited in the file of this patent

UNITED STATES PATENTS

| | | |
|---|---|---|
| 255,902 | Wegenroth | Apr. 4, 1882 |
| 891,301 | Spreen | June 23, 1908 |
| 1,478,728 | Brown | Dec. 25, 1923 |
| 2,749,639 | D'Agnillo | June 12, 1956 |